US011079990B2

(12) United States Patent
Nishio (10) Patent No.: US 11,079,990 B2
(45) Date of Patent: Aug. 3, 2021

(54) INFORMATION PROCESSING DEVICE, SYSTEM, AND NON-TRANSITORY COMPUTER READABLE MEDIUM FOR DISPLAY OF EXECUTION INSTRUCTIONS (71) Applicant: FUJIFILM Business Innovation Corp., Tokyo (JP)

(72) Inventor: Taku Nishio, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/718,191

(22) Filed: Dec. 18, 2019

(65) Prior Publication Data

US 2020/0310726 A1 Oct. 1, 2020

(30) Foreign Application Priority Data

Apr. 1, 2019 (JP) .............................. JP2019-069652

(51) Int. Cl.
*G06F 3/12* (2006.01)
(52) U.S. Cl.
CPC .......... *G06F 3/1262* (2013.01); *G06F 3/1207* (2013.01); *G06F 3/1268* (2013.01)
(58) Field of Classification Search
CPC .................................................... G06F 3/1262
USPC ....................................................... 358/1.15
See application file for complete search history.

(56) References Cited

U.S. PATENT DOCUMENTS

| 8,384,927 | B2 | 2/2013 | Harmon et al. | |
| 2007/0236725 | A1* | 10/2007 | Harmon | G06F 3/1205 |
| | | | | 358/1.15 |
| 2009/0080012 | A1* | 3/2009 | Morales | G06F 3/1208 |
| | | | | 358/1.15 |
| 2018/0136888 | A1* | 5/2018 | Robinson | H04N 1/46 |

FOREIGN PATENT DOCUMENTS

| JP | 2003-091386 | 3/2003 |
| JP | 2007-272899 | 10/2007 |
| JP | 2013-156918 | 8/2013 |

\* cited by examiner

*Primary Examiner* — Jacky X Zheng
(74) *Attorney, Agent, or Firm* — JCIPRNET (57) ABSTRACT

An information processing device includes: receiver that receives execution instructions that instruct printing to be executed; an aggregator that groups the execution instructions into an aggregation in accordance with attributes of the execution instructions; and a display controller that performs control in such a way that a first execution instruction that has been received and a second execution instruction that has not been received are displayed using different display modes in accordance with type information indicating types of the execution instructions constituting the aggregation.

20 Claims, 6 Drawing Sheets

| CONDITION FOR JOBS BELONGING TO FRAME | ARRANGEMENT WITHIN GROUP | NUMBER OF JOBS BELONGING TO FRAME | SORT CONDITION FOR JOBS WITHIN FRAME |
|---|---|---|---|
| "TYPE" = 'FRONT COVER' | START | 1 | |
| "TYPE" = 'BODY' | | 2 | "JOB NAME" ASCENDING ORDER |
| "TYPE" = 'BACK COVER' | END | 1 | |

FIG. 3

| ID | JOB NAME | STATUS | NUMBER OF COPIES | BOOKBINDING METHOD | PRODUCT ID | TYPE | TRANSMISSION DESTINATION | LOGICAL PRINTER |
|---|---|---|---|---|---|---|---|---|
| 21 | ▼ INLINE BOOKBINDING FOR BODY 1 SECTION (3 JOBS) | TRANSMISSION STANDBY | | | | | Iridesse | |
| 22 | FRONT COVER | TRANSMISSION STANDBY | 1 | INLINE | BOOK_005 | FRONT COVER | Iridesse | |
| 23 | BODY | TRANSMISSION STANDBY | 1 | INLINE | BOOK_005 | BODY | Iridesse | |
| 24 | BACK COVER | TRANSMISSION STANDBY | 1 | INLINE | BOOK_005 | BACK COVER | Iridesse | |
| 16 | ▼ OFFLINE BOOKBINDING FOR BODY 2 SECTION (4 JOBS) | TRANSMISSION STANDBY | | | | | | |
| 20 | FRONT COVER | TRANSMISSION STANDBY | 1 | OFFLINE | BOOK_004 | FRONT COVER | D136 | |
| 18 | BODY 1 | TRANSMISSION STANDBY | 1 | OFFLINE | BOOK_004 | BODY | D136 | |
| 19 | BODY 2 | TRANSMISSION STANDBY | 1 | OFFLINE | BOOK_004 | BODY | D136 | |
| 17 | BACK COVER | TRANSMISSION STANDBY | 1 | OFFLINE | BOOK_004 | BACK COVER | D136 | |
| 12 | ▼ OFFLINE BOOKBINDING FOR BODY 2 SECTION (4 JOBS) | TRANSMISSION STANDBY | | | | | | |
| 15 | FRONT COVER | TRANSMISSION STANDBY | 1 | OFFLINE | BOOK_003 | FRONT COVER | D136 | |
| 14 | BODY 1 | TRANSMISSION STANDBY | 1 | OFFLINE | BOOK_003 | BODY | D136 | |
| 25 | (SECOND BODY JOB NOT ARRIVED) | NOT RECEIVED | | OFFLINE | BOOK_003 | BODY | D136 | |
| 13 | BACK COVER | TRANSMISSION STANDBY | 1 | OFFLINE | BOOK_003 | BACK COVER | D136 | |
| 8 | ▼ INLINE BOOKBINDING FOR BODY 1 SECTION (3 JOBS) | TRANSMISSION STANDBY | | | | | | |
| 11 | FRONT COVER | TRANSMISSION STANDBY | 1 | INLINE | BOOK_002 | FRONT COVER | Iridesse | |
| 26 | (BODY JOB NOT ARRIVED) | NOT RECEIVED | | INLINE | BOOK_002 | BODY | Iridesse | |
| 9 | BACK COVER | TRANSMISSION STANDBY | 1 | INLINE | BOOK_002 | BACK COVER | Iridesse | |
| 7 | ▼ INLINE BOOKBINDING FOR BODY 1 SECTION (3 JOBS) | TRANSMISSION STANDBY | | | | | | |
| 6 | FRONT COVER | TRANSMISSION STANDBY | 1 | INLINE | BOOK_001 | FRONT COVER | Iridesse | |
| 5 | BODY | TRANSMISSION STANDBY | 1 | INLINE | BOOK_001 | BODY | Iridesse | |
| 4 | BACK COVER | TRANSMISSION STANDBY | 1 | INLINE | BOOK_001 | BACK COVER | Iridesse | |

| | ID | JOB NAME | STATUS | NUMBER OF COPIES | BOOKBINDING METHOD | PRODUCT ID | TYPE | TRANSMISSION DESTINATION | LOGICAL PRINTER |
|---|---|---|---|---|---|---|---|---|---|
| ☐ | 21 | ▶ INLINE BOOKBINDING FOR BODY 1 SECTION (3 JOBS) | TRANSMISSION STANDBY | | | | | | |
| ☐ | 22 | ☐ FRONT COVER | TRANSMISSION STANDBY | 1 | INLINE | BOOK_005 | FRONT COVER | Iridesse | |
| ☐ | 23 | ☐ BODY | TRANSMISSION STANDBY | 1 | INLINE | BOOK_005 | BODY | Iridesse | |
| ☐ | 24 | ☐ BACK COVER | TRANSMISSION STANDBY | 1 | INLINE | BOOK_005 | BACK COVER | Iridesse | |
| ☐ | 16 | ▶ OFFLINE BOOKBINDING FOR BODY 2 SECTION (4 JOBS) | TRANSMISSION STANDBY | | | | | | |
| ☐ | 20 | ☐ FRONT COVER | TRANSMISSION STANDBY | 1 | OFFLINE | BOOK_004 | FRONT COVER | D136 | |
| ☐ | 18 | ☐ BODY 1 | TRANSMISSION STANDBY | 1 | OFFLINE | BOOK_004 | BODY | D136 | |
| ☐ | 19 | ☐ BODY 2 | TRANSMISSION STANDBY | 1 | OFFLINE | BOOK_004 | BODY | D136 | |
| ☐ | 17 | ☐ BACK COVER | TRANSMISSION STANDBY | 1 | OFFLINE | BOOK_004 | BACK COVER | D136 | |
| ☐ | 12 | ▶ OFFLINE BOOKBINDING FOR BODY 2 SECTION (4 JOBS) | TRANSMISSION STANDBY | | | | | | |
| ☐ | 15 | ☐ FRONT COVER | TRANSMISSION STANDBY | 1 | OFFLINE | BOOK_003 | FRONT COVER | D136 | |
| ☐ | 14 | ☐ BODY 1 | TRANSMISSION STANDBY | 1 | OFFLINE | BOOK_003 | BODY | D136 | |
| ☐ | 25 | ☐ (SECOND BODY JOB NOT ARRIVED) | NOT RECEIVED | | OFFLINE | BOOK_003 | BODY | D136 | |
| ☐ | 13 | ☐ BACK COVER | TRANSMISSION STANDBY | 1 | OFFLINE | BOOK_003 | BACK COVER | D136 | |
| ☐ | 8 | ▶ INLINE BOOKBINDING FOR BODY 1 SECTION (3 JOBS) | TRANSMISSION STANDBY | | | | | | |
| ☐ | 11 | ☐ FRONT COVER | TRANSMISSION STANDBY | 1 | INLINE | BOOK_002 | FRONT COVER | Iridesse | |
| ☐ | 26 | ☐ (BODY JOB NOT ARRIVED) | NOT RECEIVED | | INLINE | BOOK_002 | BODY | Iridesse | |
| ☐ | 9 | ☐ BACK COVER | TRANSMISSION STANDBY | 1 | INLINE | BOOK_002 | BACK COVER | Iridesse | |

INFORMATION PROCESSING DEVICE, SYSTEM, AND NON-TRANSITORY COMPUTER READABLE MEDIUM FOR DISPLAY OF EXECUTION INSTRUCTIONS

CROSS-REFERENCE TO RELATED APPLICATIONS

This application is based on and claims priority under 35 USC 119 from Japanese Patent Application No. 2019-069652 filed Apr. 1, 2019.

BACKGROUND

(i) Technical Field

The present disclosure relates to an information processing device, an information processing system, and a non-transitory computer readable medium.

(ii) Related Art

In recent years, information processing devices have been proposed that are capable of designating a number of copies, a print range, and other print settings for each group of print jobs using a single print instruction without dividing the input into multiple jobs (for example, Japanese Unexamined Patent Application Publication No. 2013-156918).

The information processing device described in Japanese Unexamined Patent Application Publication No. 2013-156918 has: a receiving unit that receives print jobs; an analyzing unit that analyzes job attributes corresponding to the print jobs received by the receiving unit; a display unit that decides setting items to be included in each screen for job common settings, group common settings, and group specific settings in accordance with an analysis result generated by the analyzing unit; and a storage unit that stores print setting information that has been set via the screens for the job common settings, the group common settings, and the group specific settings including the setting items decided by the display unit, in a storage device in association with the print job.

SUMMARY

Aspects of non-limiting embodiments of the present disclosure relate to an information processing device, an information processing system, and a non-transitory computer readable medium with which, in a case where a series of print jobs are to be executed by means of multiple related execution instructions, it is possible to display execution instructions that are deficient and execution instructions that are sufficient from among the multiple related execution instructions in a distinguishable manner.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including: a receiver that receives execution instructions that instruct printing to be executed; an aggregator that groups the execution instructions into an aggregation in accordance with attributes of the execution instructions; and a display controller that performs control in such a way that a first execution instruction that has been received and a second execution instruction that has not been received are displayed using different display modes in accordance with type information indicating types of the execution instructions constituting the aggregation.

BRIEF DESCRIPTION OF THE DRAWINGS

An exemplary embodiment of the present disclosure will be described in detail based on the following figures, wherein:

FIG. 3 is a drawing depicting an example of a display screen;

DETAILED DESCRIPTION

An exemplary embodiment of the present disclosure will be described hereinafter with reference to the drawings. It should be noted that, in the drawings, constituent elements having substantially the same function are denoted by the same reference numbers and duplicate descriptions thereof are omitted.

Exemplary Embodiment

Figure 1:
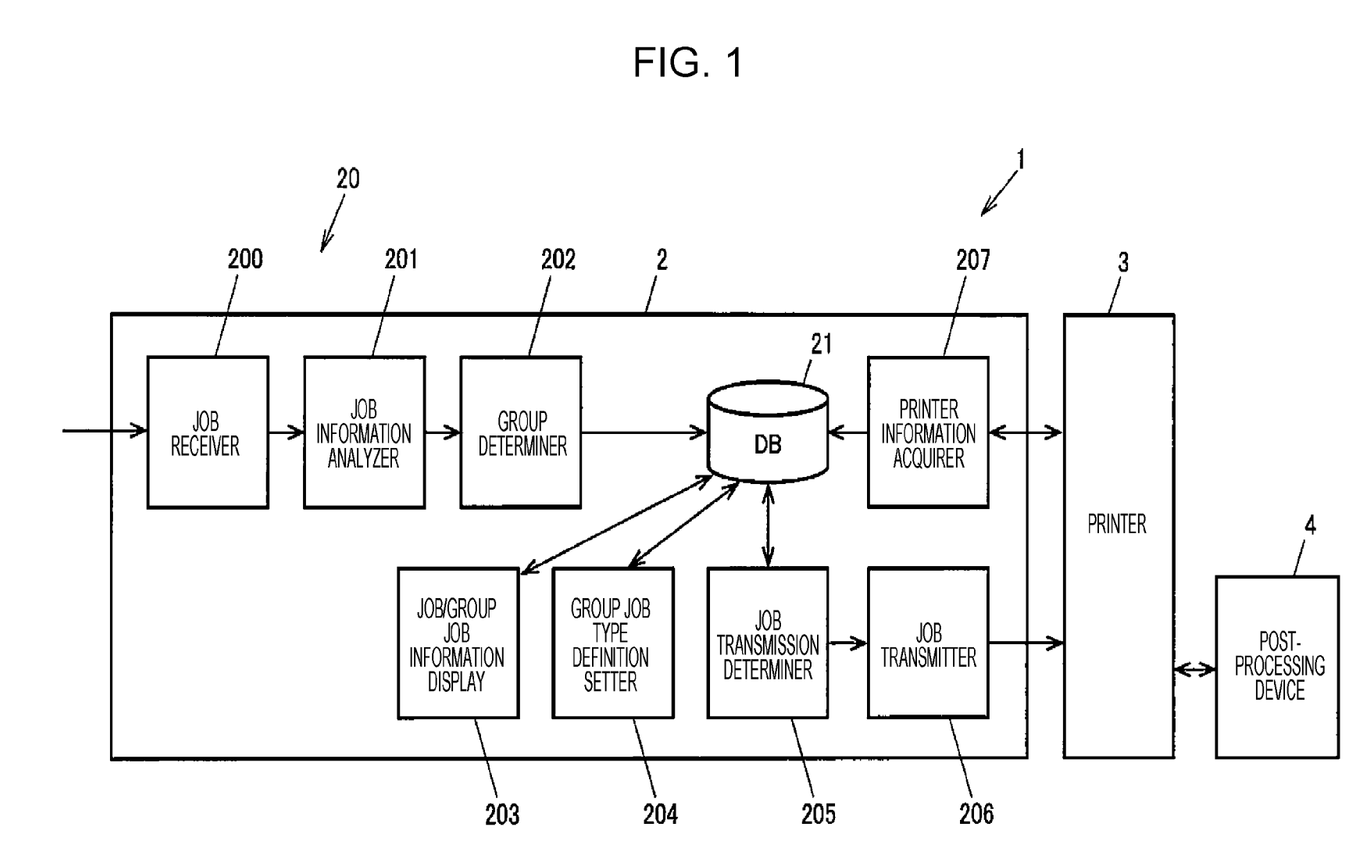
FIG. 1 is a block diagram depicting an example of a configuration of an information processing system according to an exemplary embodiment of the present disclosure.

FIG. 1 is a block diagram depicting an example of a configuration of an information processing system according to an exemplary embodiment of the present disclosure. As depicted in FIG. 1, this information processing system 1 is configured having an information processing device 2, and a printer 3 and a post-processing device 4 that are connected to the information processing device 2. It should be noted that the arrows in FIG. 1 indicate the flow of information and signals exchanged among the units described later.

For example, a personal computer or a mobile information terminal such as a tablet terminal or a multifunction mobile telephone (smartphone) can be used as this kind of information processing device 2. The printer 3 includes a multifunction device, a continuous feed device, a cut paper printer, or the like.

The post-processing device 4 may be an inline type that is connected to the printer 3, or may be an offline type that is physically separated from the printer 3 and is not directly connected to the printer 3. With an inline type, the transport path for a recording medium is shared by the printer 3 and the post-processing device 4, and it is possible for up to post-processing to be executed by means of print instructions for the printer 3. With an offline type, post-processing is carried out at a different timing from the print instructions for the printer 3.

(Configuration of Information Processing Device 2)

The information processing device 2 according to an exemplary embodiment of the present disclosure is provided with a controller 20 that controls each unit, and a storage (also referred to as a "DB" hereinafter) that stores various types of data. The controller 20 is configured of a CPU (central processing unit), an interface, and the like.

The CPU operates in accordance with a program stored in the storage 21, and thereby functions as a job receiver 200, a job information analyzer 201, a group determiner 202, a job/group job information display 203, a group job type definition setter 204, a job transmission determiner 205, a job transmitter 206, a printer information acquirer 207, or the like. The details of the units 200 to 207 will be described later.

Figure 2:
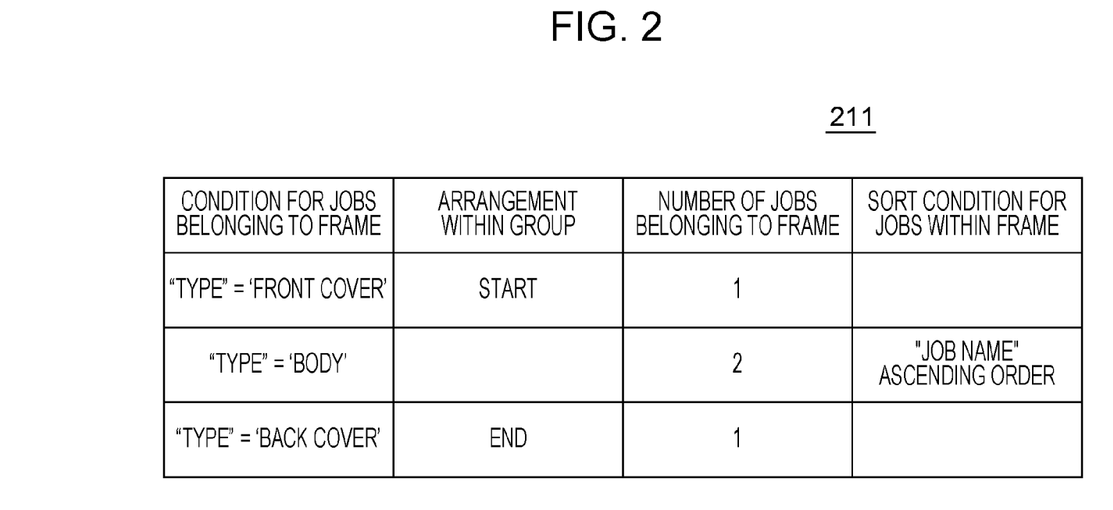
FIG. 2 is a drawing depicting an example of a group configuration frame table.

The DB 21 is configured of a ROM (read only memory), a RAM (random access memory), a hard disk, or the like, and stores various types of data such as the program and a group configuration frame table 211 (see FIG. 2). Furthermore, the DB 21 manages job attribute information indicating job attributes such as the job type, group job type definition information (simply referred to as "type definition information" hereinafter), group job information, printer information, and the like.

Here, a "job" (also referred to as a "print job" hereinafter) refers to a print instruction that instructs the printer 3 to execute printing. A print instruction is an example of an execution instruction. A job includes print setting information in which various types of settings required to execute printing are recorded, and print data written in a page description language (PDL) such as PDF (Portable Document Format) or PostScript (registered trademark) that can be interpreted by the printer 3.

A "group job" refers to an aggregation of jobs into which multiple print jobs relating to each other have been grouped. In a group job, multiple print jobs are grouped and aggregated into one bundle according to a condition that is common thereto, such as a "product ID" described later, for example. A "group" refers to an aggregation to which one job belongs.

The "type" of a job refers to a condition that is common to jobs for configuring a group, and the attributes of a job correspond thereto. In other words, the "type" is one condition with which it is determined whether or not a job belongs to a frame (described later).

Furthermore, a group job type definition (also simply referred to as a "group type definition" or a "type definition" hereinafter) refers to a basis for classifying jobs into groups. A group job type definition, for example, includes job attributes such as a product ID (described later), and in this case, multiple jobs having common product IDs are grouped into one group.

The job receiver 200 receives a job. The job information analyzer 201 analyzes print setting information and print data information included in the job received by the job receiver 200.

The group determiner 202 determines a group to which the received job belongs, in accordance with information obtained by the job information analyzer 201, group job type definitions stored in the DB 21, the group configuration frame table 211, and information on the creation status of group jobs. Furthermore, the group determiner 202 functions as a grouping unit that groups print jobs according to the attributes thereof. The grouping unit is an example of an aggregator.

Furthermore, the group determiner 202 stores the determination result and the job in association with each other in the DB 21. It should be noted that the group determiner 202 may create a new group if there is no group to which the received job belongs.

The job/group job information display 203 presents job attribute information and group job information to an operator (also referred to as a "user" hereinafter). The job/group job information display 203 is an example of a display controller.

The group job type definition setter 204 defines group determination conditions according to job attributes, conditions for constituent elements of groups, arrangements, quantities, sort conditions, display information for jobs that are missing (also simply referred to as "missing jobs" hereinafter), a control method for when there is a missing job, and the like.

The job transmission determiner 205 controls transmission in accordance with group job type definition settings. The job transmitter 206 transmits jobs included in a group job for which transmission has been instructed, to the printer 3 by a method that corresponds to the transmission destination printer 3.

The printer information acquirer 207 periodically issues queries to the printer 3, acquires information such as the configuration of the printer 3, paper information, and the status, and stores the information in the DB 21.

(Table Configuration)

FIG. 2 is a drawing depicting an example of the group configuration frame table 211. The group configuration frame table 211 is a table in which conditions for jobs constituting groups are determined, and information relating to partial groups (in other words, subgroups (also referred to as "frames" or "definition frames" hereinafter)) that are required for the configuration of the group in question is recorded therein.

Specifically, the group configuration frame table 211 is provided with a "condition for jobs belonging to frame" column, an "arrangement within group" column, a "number of jobs belonging to frame" column, and a "sort condition for jobs within frame" column.

Recorded in the "condition for jobs belonging to frame" column are conditions for a job to belong the aforementioned "frame". As an example, a frame may be configured according to the aforementioned "type" and, in this case, is recorded with the character string "type" being surrounded by double quotation marks (" "), and a value indicating the content of the "type" being surrounded by single quotation marks (' '), for example. As depicted in FIG. 2, for the "type", information is recorded indicating types that are classified according to the content to be printed such as "front cover", "body", and "back cover", for example.

Recorded in the "arrangement within group" column is information indicating the position in which the frame in question is arranged within a group, such as the "start" or the "end", for example. Recorded in the "number of jobs belonging to frame" column is information indicating a predetermined quantity, which is required for completion as a frame. Recorded in the "sort condition for jobs within frame" column are conditions by which jobs are arranged, particularly for the case where there are multiple jobs constituting a frame.

(Display Screen)

FIG. 3 is a drawing depicting an example of a display screen. A display screen 6 presents the status regarding the sufficiency/deficiency of group jobs in a visible manner to the user. The display screen 6 is displayed by the aforementioned job/group job information display 203 on a designated display surface such as a display surface (not depicted) of the information processing device 2, a display surface (not depicted) of the printer 3, or a display surface (not depicted) of a terminal apparatus (not depicted) connected to the information processing device 2.

The display screen 6 includes, for example, an "ID" column showing identification information that identifies jobs, a "job name" column showing the names of jobs, a "status" column showing the statuses of jobs, a "number of copies" column showing quantities instructed to be printed according to jobs, a "bookbinding method" column showing bookbinding methods, a "product ID" column showing identification information affixed to finished products of the printed material generated according to the jobs, a "type" column showing types, a "transmission destination" column showing the printer 3 that is the transmission destination for the jobs, and also a "logical printer" or the like, and the statuses of jobs are shown as a list.

Jobs are grouped and displayed according to each group 61 on the display screen 6. It should be noted that the groups 61 are indicated by quadrilateral frames for the convenience of the description; however, quadrilateral frames do not necessarily have to be displayed on the actual display screen 6.

Furthermore, each row represents a job 62. Frames representing the jobs 62 are provided corresponding to information recorded in the aforementioned group configuration frame table 211. In addition to jobs 62a that have been received by the job receiver 200 (also referred to as "arrived jobs" hereinafter), jobs 62b that have not arrived and have not been received by the job receiver 200 are also displayed (in other words, the aforementioned missing jobs; also referred to as "placeholder jobs" hereinafter). The arrived jobs 62a are an example of a first execution instruction. The placeholder jobs 62b, namely jobs that have not arrived or missing jobs, are an example of a second execution instruction.

Further, for the placeholder jobs 62b, explanatory text 620 may also be displayed indicating that the job in question has not arrived, in other words, has not been received by the job receiver 200. The explanatory text 620 is an example of explanatory information.

Furthermore, the arrived jobs 62a and the placeholder jobs 62b are displayed in the same columns but are displayed in a distinguishable manner using different display modes. For example, the background color, character thickness, character size, and so forth for frames corresponding to the placeholder jobs 62b may be displayed in such a way as to be different from the background color, character thickness, character size, and so forth for frames corresponding to the arrived jobs 62a.

(Operation in Exemplary Embodiment)

Figure 4:
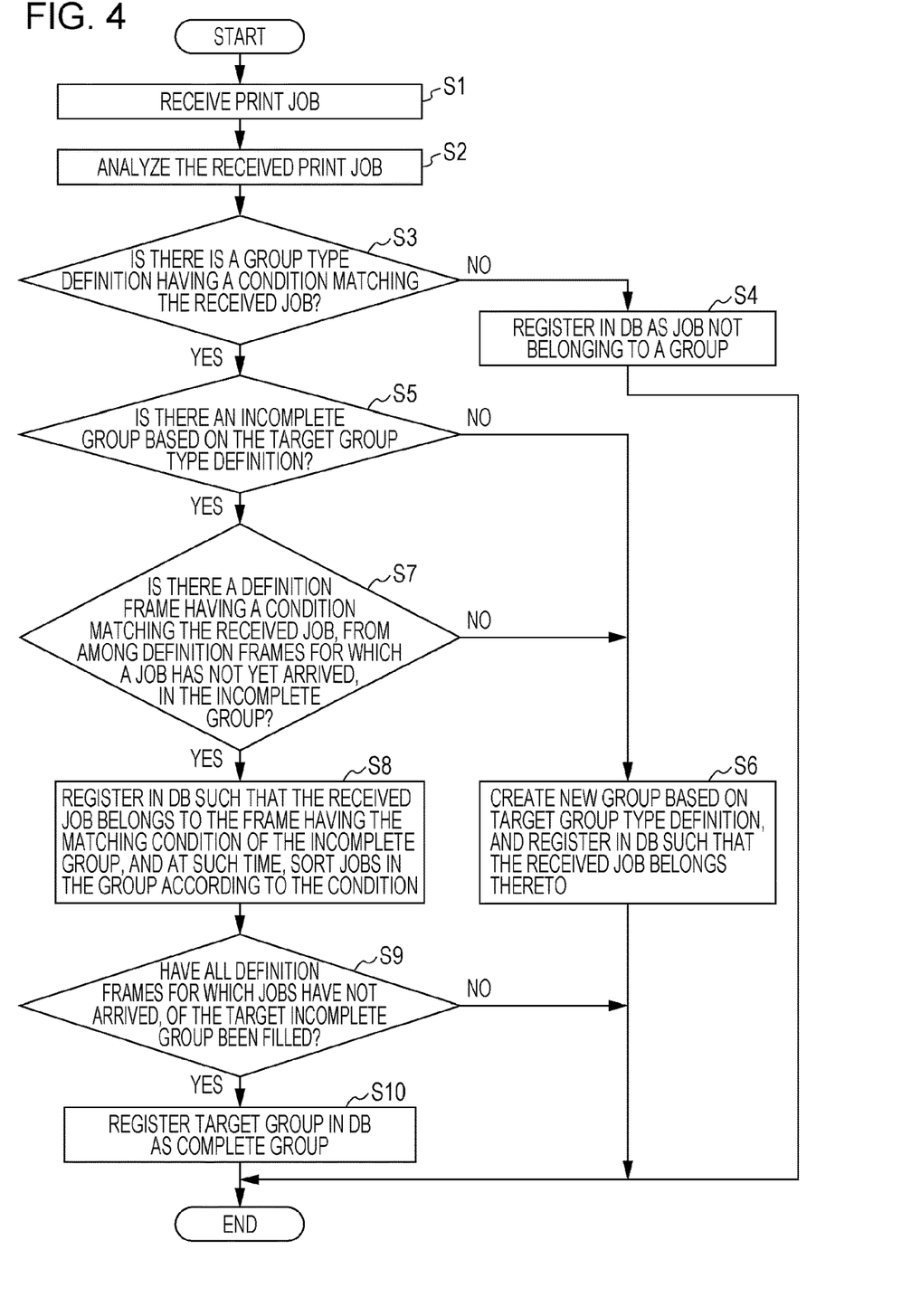
FIG. 4 is a flowchart depicting an example of an operation of an information processing device according to the present exemplary embodiment.

Next, an example of an operation carried out by the information processing device 2 will be described with reference to FIG. 4. The job receiver 200 receives a print job transmitted to the information processing device 2 (S1). The job information analyzer 201 analyzes the print job received by the job receiver 200 (also simply referred to as a "received job" hereinafter) (S2).

The group determiner 202 performs a comparison between the group configuration frame table 211 and the analysis result for the received job, and determines whether or not there is a group type definition having a condition matching the received job (S3).

If there is no group type definition having a condition matching the received job (S3: no), the group determiner 202 registers the received job in the DB 21 as a job that does not belong to a group (S4).

If there is a group type definition having a condition matching the received job (S3: yes), the group determiner 202 determines whether or not there is an incomplete group based on the target group type definition (S5).

If there is no incomplete group based on the target group type definition (S5: no), the group determiner 202 creates a new group based on the target group type definition, and registers the received job in the DB 21 in such a way as to belong to the new group (S6).

If there is an incomplete group based on the target group type definition (S5: yes), the group determiner 202 determines whether or not there is a definition frame having a condition matching the received job from among definition frames for which a job has not yet arrived in the incomplete group (S7).

If there is a definition frame having a condition matching the received job from among definition frames for which a job has not yet arrived in the incomplete group (S7: yes), the received job is registered in the DB 21 in such a way as to belong to the frame having the matching condition of the incomplete group. At such time, the jobs in the group are sorted according to the condition (S8).

If there is no definition frame having a condition matching the received job from among definition frames for which a job has not yet arrived in the incomplete group (S7: no), an operation similar to that in the aforementioned step S6 is carried out. In other words, the group determiner 202 creates a new group based on the target group type definition, and registers the received job in the DB 21 in such a way as to belong to the new group.

Next, the group determiner 202 determines whether or not all definition frames for which jobs have not arrived of the target incomplete group have been filled (S9). If all definition frames for which jobs have not arrived of the target incomplete group have been filled (S9: yes), the group determiner 202 registers the target group in the DB 21 as a complete group (S10).

Application Example

An application example of the aforementioned information processing device 2 will be described next. As an example, the information processing device 2 according to the aforementioned exemplary embodiment may be applied to a process in which bookbinding is carried out. Hereinafter, descriptions will be given regarding: (1) a case where an inline type of bookbinding machine is used as the post-processing device 4 (also simply referred to as "inline bookbinding" hereinafter), and (2) a case where an offline type of bookbinding machine is used as the post-processing device 4 (also simply referred to as "offline bookbinding" hereinafter).

(1) Inline Bookbinding

In the case of inline bookbinding, if there is a job that has not arrived, a restriction may be applied to uniformly advancing all jobs within a group to the next step regardless of whether or not the jobs have arrived. In other words, the information processing device 2 may be further provided with a prohibiter that prohibits printing to be executed by jobs within a group if there is a job that has not arrived. Furthermore, the information processing device 2 may be provided with a permitter that permits printing to be executed by jobs within a group if there are no jobs that have not arrived. In these cases, the display mode may be changed between: the case where there is a job that has not arrived and advancing jobs to the next step is prohibited; and the case where there are no jobs that have not arrived and advancing jobs to the next step is permitted.

(2) Offline Bookbinding

Figure 5:
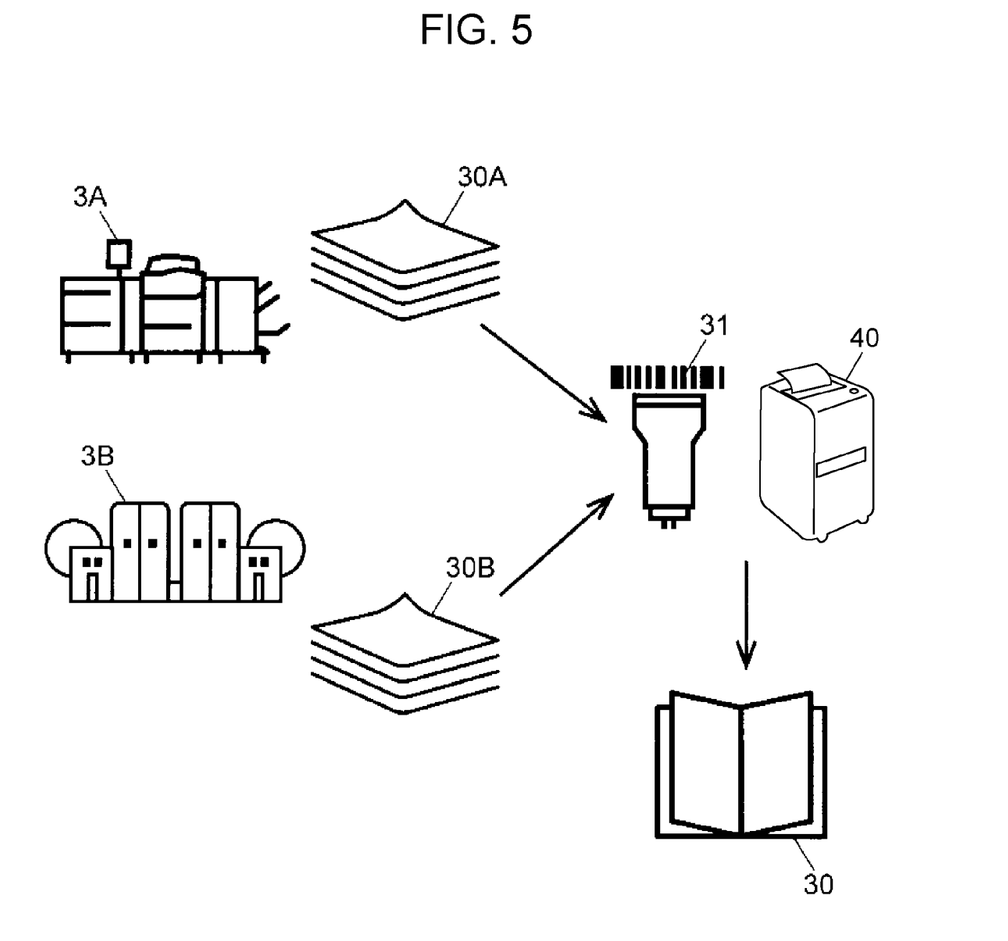
FIG. 5 is a drawing schematically depicting an example of offline bookbinding.
Figure 6:
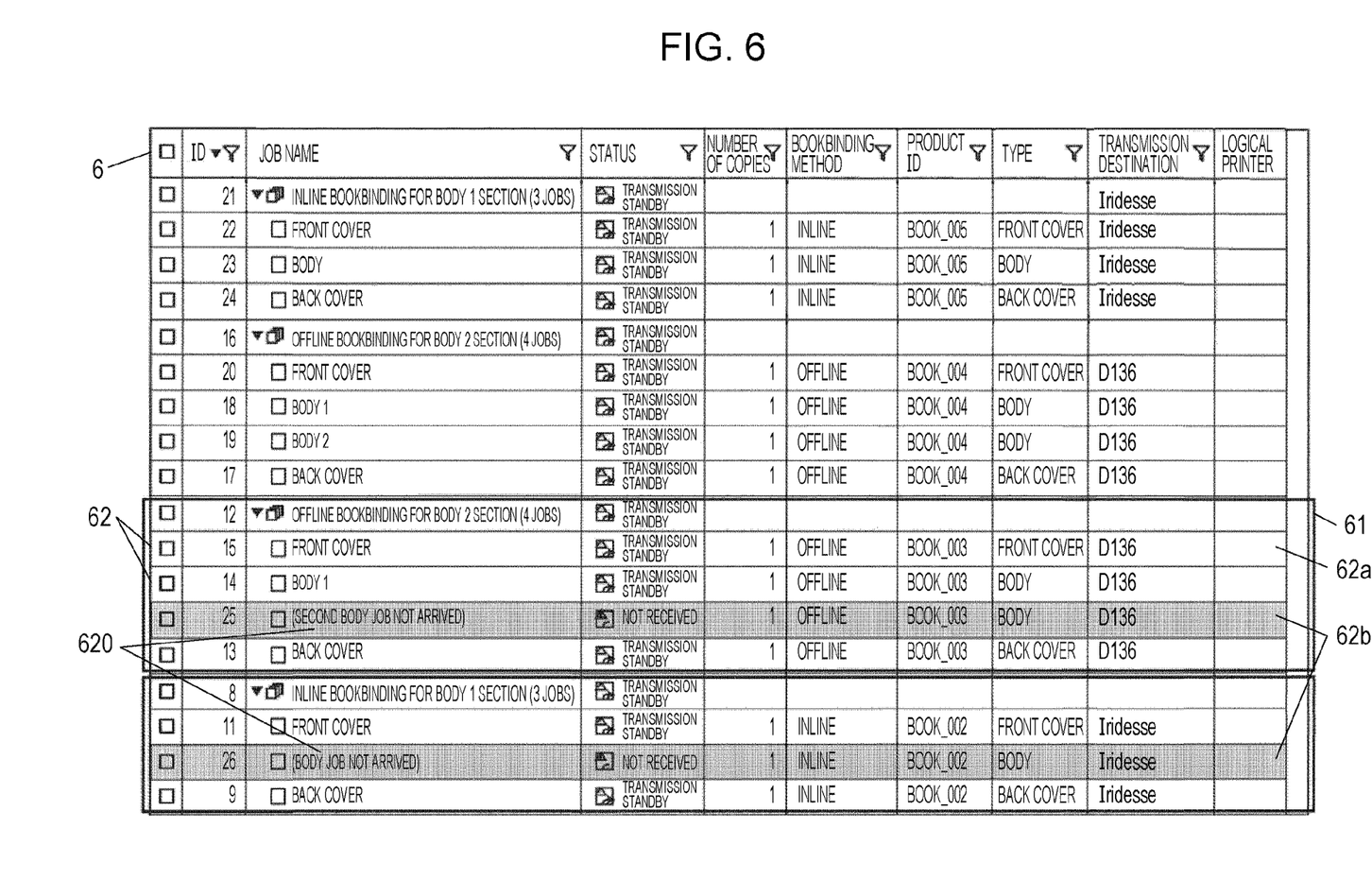
FIG. 6 is a drawing depicting a modified example of the display screen.

FIG. 5 is a drawing schematically depicting an example of offline bookbinding. FIG. 6 is a drawing depicting a modified example of the display screen 6. The information processing system 1 is further provided with a bookbinding machine 40 in addition to the aforementioned configuration. In offline bookbinding, as depicted in FIG. 5, printing is executed in a parallel manner with jobs being allocated to multiple printers 3 (here, a first printer 3A and a second printer 3B).

Furthermore, in offline bookbinding, first printed material 30A that is output from the first printer 3A and second printed material 30B that is output from the second printer 3B are arranged so as to abut each other for one book 30 to be made by the bookbinding machine 40. At such time, the information processing system 1 may be able to recognize that both the first printed material 30A and the second printed material 30B are common as the one book 30 by a barcode 31 being affixed to each thereof.

In such a case, even if there is a job that has not arrived within one group, the arrived jobs only may be advanced to the next step without waiting for the arrival of the job that has not arrived. In other words, the arrived jobs only may be transmitted to the printer 3 instructed as the transmission destination. Offline bookbinding is an example of the case where printing is not prohibited by the aforementioned prohibiter.

Specifically, as depicted in FIG. 6, in a group 61 having the product ID "BOOK_003" displayed as one group on the display screen 6 (see the upper quadrilateral frame out of the two quadrilateral frames in FIG. 6), the job for a "front cover" having job ID "15", the job for a "body 1" having job ID "14", and the job for a "back cover" having job ID "13" that have arrived may be transmitted in advance to the printer 3, and printing for these jobs may be executed in advance. Furthermore, in this case, the job for a "body 2" having job ID "25" may be transmitted to the printer 3 upon arrival.

Furthermore, although not depicted, in a case where there are no jobs that have not arrived (in other words, in a case where all definition frames have been filled), it may be clearly displayed that there are no jobs that have not arrived. For example, for job ID "16", it is feasible for the explanatory text "all jobs have arrived" or "printable" to be affixed thereto, for blue hatching to be applied to the entire group, and so forth. In addition, the case where there are no arrived jobs, the case where there are jobs that have not arrived, and the case where there are no jobs that have not arrived (in other words, all definition frames have been filled) may be indicated using display modes that are different from each other for these three cases. In other words, the case where there are no arrived jobs, the case where there are jobs that have not arrived, and the case where there are no jobs that have not arrived may be indicated by changing the display mode in stages.

Specifically, in the case where there are no arrived jobs, a display mode may be implemented indicating that there are no jobs that can be executed, in the case where there are jobs that have not arrived, a display mode may be implemented indicating that arrived jobs are to be advanced to the next stage only for offline bookbinding, and in the case where there are no jobs that have not arrived, a display mode may be implemented indicating that the jobs of the group can be executed at the same time.

More specifically, as an example, if the background of a frame indicating a group configuration is given as an example, the case where there are no arrived jobs may be indicated with the background having no color or being gray, for example, the case where there are jobs that have not arrived may be indicated with the background having a specific color such as yellow, for example, and the case where there are no jobs that have not arrived may be indicated with the background having another specific color such as blue, for example.

An exemplary embodiment of the present disclosure has been described hereinabove; however, exemplary embodiments of the present disclosure are not restricted to the aforementioned exemplary embodiment, and various modifications and implementations are possible without altering the gist of the present disclosure. For example, in the aforementioned exemplary embodiment, jobs that have not arrived are indicated using a mode representing a deficient state; however, the present disclosure is not restricted to this method provided that the mode makes it possible to distinguish between jobs that have arrived and jobs that have not arrived, and jobs that have arrived may be indicated using a mode representing a sufficient state.

Furthermore, for example, the type definition information is not necessarily restricted to being predetermined, and it may be possible for the type definition information to be set after a fixed number of jobs have been received. In this case, for example, received jobs may be temporarily stored in the DB 21 or the like, types may be defined thereafter, and the stored jobs may be allocated according to these definitions.

Some or all of each unit of the controller 20 may be configured by means of hardware circuits such as a reconfigurable circuit (FPGA: field programmable gate array) and an application specific integrated circuit (ASIC).

Furthermore, it is possible for some of the constituent elements of the aforementioned exemplary embodiment to be omitted or altered without altering the gist of the present disclosure. Furthermore, it is possible for steps to be added, deleted, altered, switched, and so forth in the flow of the aforementioned exemplary embodiment without altering the gist of the present disclosure. Furthermore, a program used in the aforementioned exemplary embodiment can be provided recorded on a computer-readable recording medium such as a CD-ROM, and can also be stored on an external server such as a cloud server and used via a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor, configured to:
receive execution instructions that instruct printing to be executed;
group the execution instructions into a plurality of groups in accordance with attributes of the execution instructions;
perform control in such a way that a first group comprising a plurality of first execution instructions that have been all received by the information processing device and a second group comprising a plurality of second execution instructions that have not all been received by the information processing device are displayed using different display modes in accordance with type information indicating types of the execution instructions constituting the plurality of groups;

in a case where a post-processing device is an inline type bookbinding machine, permit execution of the first execution instructions of the first group and prohibit execution of the second execution instructions of the second group; and in a case where the post-processing device is an offline type bookbinding machine, permit the execution of the first execution instructions of the first group and the execution of the second execution instructions of the second group.

2. The information processing device according to claim 1, wherein the type information is determined in accordance with target types for which printing is instructed according to the execution instructions.

3. The information processing device according to claim 2, wherein the processor performs control in such a way that frames provided for each of the target types are displayed as the types, and explanatory information indicating that the second execution instruction has not been received is displayed for a frame corresponding to the second execution instruction that has not been received.

4. The information processing device according to claim 3, wherein the processor prohibits printing to be executed according to the execution instructions included in the plurality of groups, in a case where the second execution instructions that have not all been received is present.

5. The information processing device according to claim 4, wherein the processor permits printing to be executed according to the execution instructions included in the plurality of groups, in a case where the execution instructions constituting the plurality of groups are all the first execution instructions.

6. The information processing device according to claim 3, wherein the processor permits printing to be executed according to the execution instructions included in the plurality of groups, in a case where the execution instructions constituting the plurality of groups are all the first execution instructions.

7. The information processing device according to claim 6, wherein, in a case where printing to be executed is not prohibited, the processor performs control in such a way that a display mode is changed in stages between a case where the execution instruction is not present, a case where the execution instruction is present, and a case where the execution instruction is not present.

8. The information processing device according to claim 2, wherein the processor prohibits printing to be executed according to the execution instructions included in the plurality of groups, in a case where the second execution instructions that have not all been received is present.

9. The information processing device according to claim 8, wherein the processor permits printing to be executed according to the execution instructions included in the plurality of groups, in a case where the execution instructions constituting the plurality of groups are all the first execution instructions.

10. The information processing device according to claim 9, wherein, in a case where printing to be executed is not prohibited, the processor performs control in such a way that a display mode is changed in stages between a case where the execution instruction is not present, a case where the execution instruction is present, and a case where the execution instruction is not present.

11. The information processing device according to claim 2, wherein the processor permits printing to be executed according to the execution instructions included in the plurality of groups, in a case where the execution instructions constituting the plurality of groups are all the first execution instructions.

12. The information processing device according to claim 11, wherein, in a case where printing to be executed is not prohibited, the processor performs control in such a way that a display mode is changed in stages between a case where the execution instruction is not present, a case where the execution instruction is present, and a case where the execution instruction is not present.

13. The information processing device according to claim 1, wherein the processor prohibits printing to be executed according to the execution instructions included in the plurality of groups, in a case where the second execution instructions that have not all been received is present.

14. The information processing device according to claim 13, wherein the processor that permits printing to be executed according to the execution instructions included in the plurality of groups, in a case where the execution instructions constituting the plurality of groups are all the first execution instructions.

15. The information processing device according to claim 14, wherein, in a case where printing to be executed is not prohibited, the processor performs control in such a way that a display mode is changed in stages between a case where the execution instruction is not present, a case where the execution instruction is present, and a case where the execution instruction is not present.

16. The information processing device according to claim 1, wherein the processor permits printing to be executed according to the execution instructions included in the plurality of groups, in a case where the execution instructions constituting the plurality of groups are all the first execution instructions.

17. The information processing device according to claim 16, wherein, in a case where printing to be executed is not prohibited, the processor performs control in such a way that a display mode is changed in stages between a case where the execution instruction is not present, a case where the execution instruction is present, and a case where the execution instruction is not present.

18. The information processing device according to claim 1, wherein the processor implements a display indicating that the execution instructions constituting the plurality of groups have all been received.

19. An information processing system comprising:
the information processing device according to claim 1; and
a printer that executes printing according to an instruction from the information processing device.

20. A non-transitory computer readable medium storing a program causing a computer to execute a process comprising:
receiving execution instructions that instruct printing to be executed;
grouping the execution instructions into a plurality of groups in accordance with attributes of the execution instructions;
performing control in such a way that a first group comprising a plurality of first execution that have been all received by the information processing device and a second group comprising a plurality of second execution instructions that have not all been received by the information processing device are displayed using different display modes in accordance with type information indicating types of the execution instructions constituting the plurality of groups;
in a case where a post-processing device is an inline type bookbinding machine, permitting execution of the first execution instructions of the first group and prohibiting execution of the second execution instructions of the second group; and
in a case where the post-processing device is an offline type bookbinding machine, permitting the execution of the first execution instructions of the first group and the execution of the second execution instructions of the second group.

* * * * *